(12) United States Patent
Cunningham et al.

(10) Patent No.: US 9,286,349 B2
(45) Date of Patent: *Mar. 15, 2016

(54) DYNAMIC SEARCH SYSTEM

(71) Applicant: International Business Machines Corporation, Armonk, NY (US)

(72) Inventors: Russell E. Cunningham, Universal City, TX (US); Jason W. Hayes, Austin, TX (US); Darshan Patel, Austin, TX (US); Satish K. Rao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/033,887

(22) Filed: Sep. 23, 2013

(65) Prior Publication Data

US 2015/0006578 A1 Jan. 1, 2015

Related U.S. Application Data

(63) Continuation of application No. 13/929,011, filed on Jun. 27, 2013.

(51) Int. Cl.
*G06F 17/30* (2006.01)
*G06F 7/00* (2006.01)

(52) U.S. Cl.
CPC .... *G06F 17/30448* (2013.01); *G06F 17/30899* (2013.01)

(58) Field of Classification Search
CPC ............... G06F 17/30864; G06F 17/30867; G06F 17/30637; G06Q 30/02; G06Q 30/0241

USPC ......................................................... 707/706
See application file for complete search history.

(56) References Cited

U.S. PATENT DOCUMENTS

| | | | |
|---|---|---|---|
| 6,633,867 B1 | 10/2003 | Kraft et al. | |
| 7,349,845 B2 | 3/2008 | Coffman et al. | |
| 7,809,718 B2 | 10/2010 | Brinker et al. | |
| 8,010,523 B2 | 8/2011 | Djabarov | |
| 2009/0150349 A1 | 6/2009 | Cartin et al. | |
| 2009/0310764 A1* | 12/2009 | Gerhart | G06Q 10/06 379/142.04 |
| 2011/0022433 A1* | 1/2011 | Nielsen | G06Q 10/06 705/7.27 |
| 2011/0167053 A1* | 7/2011 | Lawler et al. | 707/709 |
| 2011/0225178 A1* | 9/2011 | Ingrassia | G06F 17/30038 707/769 |
| 2011/0238657 A1* | 9/2011 | Hammond | G06F 17/30699 707/723 |
| 2011/0294457 A1* | 12/2011 | Braznell | G08B 21/0227 455/404.1 |

* cited by examiner

*Primary Examiner* — Usmaan Saeed
*Assistant Examiner* — Raquel Perez-Arroyo
(74) *Attorney, Agent, or Firm* — Penny L. Lowry; Parashos Kalaitzis (57) ABSTRACT

A method is described of dynamically searching a search domain. A first result set of data objects is presented. The first result set is obtained from a first search of a search domain having active and inactive data objects for first search features obtained from a source data object. An update is detected in the search domain. Key features are extracted from the source data object to be included in second search features when the update in the search domain is in the source data object. A second search of the updated search domain is performed for data objects having the second search features.

6 Claims, 7 Drawing Sheets

| | QUESTIONS | WEIGHTED VALUE | COMMENT |
|---|---|---|---|
| 520 | Location = Problem Description | 5 | Brief description of the problem likely to have critical information |
| 525 | Component | 5 | Same components may have same issue |
| 530 | Record# = 1 | 4 | Initial section of the data object is likely to contain a detailed description of the problem and the customer environment |
| 535 | Severity Value | 4 | Similar severities may be compared |
| 540 | Teams | 3 | Different teams may have different information |
| 545 | Last Record | 5 | Likely to contain final solution |

FIG. 5

| Unstructured/Text Data | Structured Data |
|---|---|
| UPDATE1 | UPDATE1 |
| UPDATE2 | UPDATE2 |
| UPDATE3 | UPDATE3 |

| Unstructured (text) Data | Structured Data |
|---|---|
| HVZ: Problem summary | <author>, <severity>, <hours spent>, <team>, <component> |
| HVZ: First entry in the Data Object | <author>, <severity>, <hours spent>, <team>, <component> |
| Low Value Zone | <author>, <severity>, <hours spent>, <team>, <component> |
| HVZ: Problem severity Increased | <author>, <severity>, <hours spent>, <team>, <component> |
| Low Value Zone | <author>, <severity>, <hours spent>, <team>, <component> |
| HVZ: Last Record | <author>, <severity>, <hours spent>, <team>, <component> |

605 — Unstructured column; 610 — Structured column

DYNAMIC SEARCH SYSTEM

CROSS-REFERENCE TO RELATED APPLICATIONS

This application is a continuation of co-pending U.S. patent application Ser. No. 13/929,011, filed Jun. 27, 2013. The aforementioned related patent application is herein incorporated by reference in its entirety.

FIELD

The present invention generally relates to data searching, and more specifically, dynamic search systems.

BACKGROUND

A search engine is typically a software system that is designed to search for data objects in a database. Search engines have become ubiquitous today due to large amounts of data created by computer systems. It would be time consuming for a user of a large database to sift through all of the data objects in the database to locate all useful information. A search engine quickly scans through all the data objects within the database to locate key features provided by the user. The search engine may return a list of data objects containing the features searched to narrow the user's search of useful information. Familiar search engines include those that are used to search for information on web pages on the Internet. Other purposes search engines may be used for are searching books in a library, searching for help topics in computer software, and looking for particular files on a computer along with many other uses.

SUMMARY

One embodiment is directed to a method and computer system configured to perform the method of dynamically searching a search domain. A first result set of data objects is presented. The first result set is obtained from a first search of a search domain having active and inactive data objects for first search features obtained from a source data object. An update is detected in the search domain. Key features are extracted from the source data object to be included in second search features when the update in the search domain is in the source data object. A second search of the updated search domain is performed for data objects having the second search features.

Another embodiment is directed to a computer readable storage medium having instructions stored thereon which, when executed, cause a processor to perform the method described above.

BRIEF DESCRIPTION OF THE DRAWINGS

In the drawings and the Detailed Description, like numbers generally refer to like components, parts, steps, operations, and processes.

DETAILED DESCRIPTION

In a typical search scenario, search features may be submitted to a search engine, which then uses various search algorithms against a search domain to find results. Search features may be search terms or data that may be searched in the source domain. In certain search scenarios, a user's task may involve conducting a plurality of searches during the life of the task to find data objects that may help complete the task. A task may span over long stretches of time and may be within the search domain itself as a data object. Over that time, the task may receive updates. Not only may the task be updated over time, but the search domain may be updated with additional and updated data objects. An additional update to the search domain may have useful information for completing the task. In some situations, the user may only update the search results (also referred herein as a result set) occasionally to locate new data objects. Furthermore, the user may not update search features when performing a new search or may not provide all of the key features of a task data object (also referred herein as a source data object) to the search features.

Embodiments herein provide for a dynamic search system that may automatically search for new search results upon detecting an update in a source data object from which search features are obtained. In other embodiments, the dynamic search system may automatically update the result set upon detecting an update in the search domain. Embodiments may also provide for automatically extracting key features from the source data object to be included in the search of the search domain.

Figure 1:
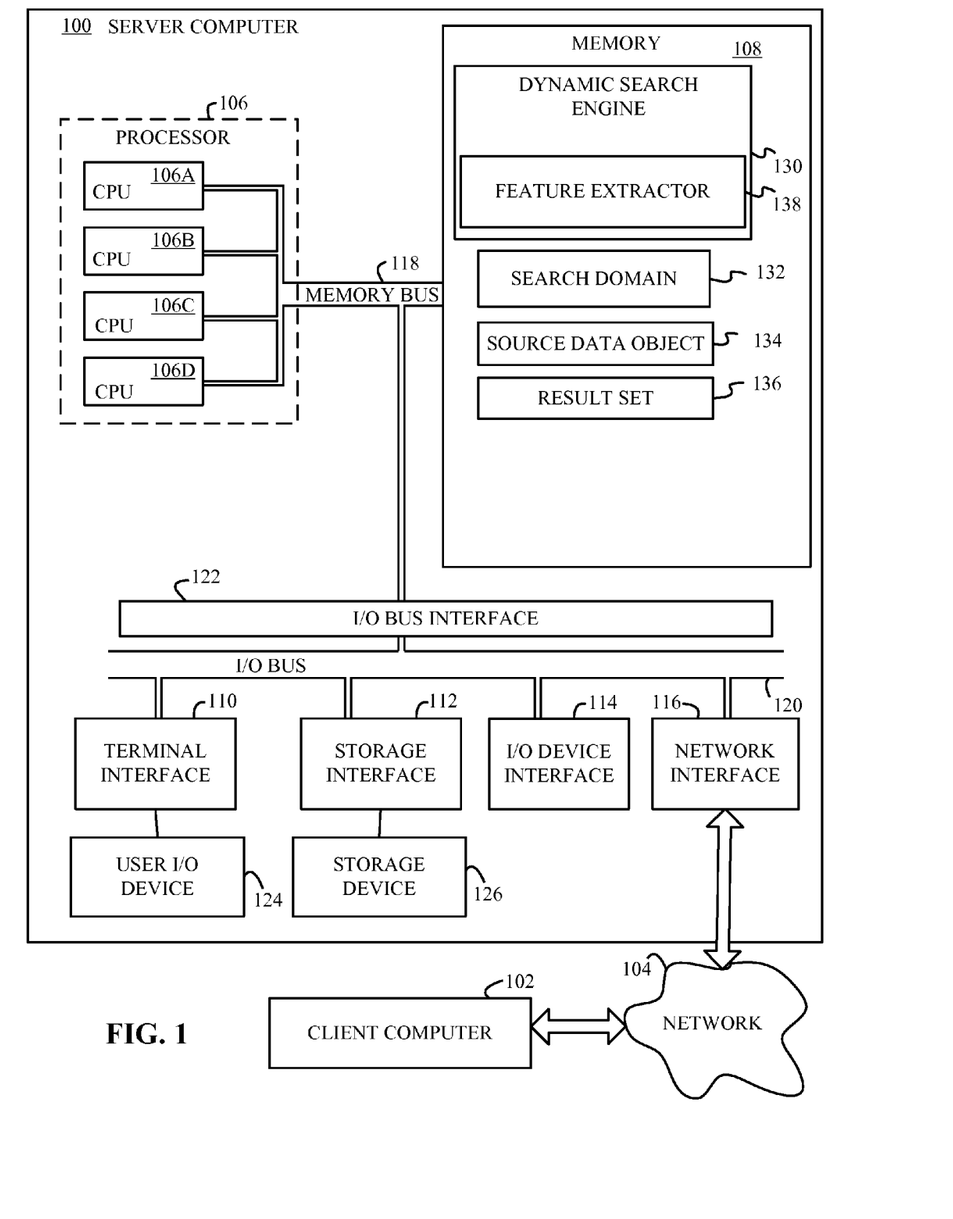
FIG. 1 depicts a high-level block diagram of an exemplary computer system for implementing an embodiment.

Referring to the drawings FIG. 1 depicts a high-level block diagram representation of a server computer system 100 connected to a client computer system 102 via a network 104, according to an embodiment. The terms "server" and "client" are used herein for convenience only, and in various embodiments a computer system that operates as a client computer in one environment may operate as a server computer in another environment, and vice versa. The mechanisms and apparatus of embodiments apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices.

The main memory 108 may store or encode a dynamic search engine 130, a search domain 132, a source data object 134, a result set 136, and a feature extractor 138. Although the dynamic search engine 130, the search domain 132, the source data object 134, the result set 136, and the feature extractor 138 are illustrated as being contained within the memory 108 in the computer system 100, in other embodiments some or all of them may be on different computer systems and may be accessed remotely, e.g., via the network 104. The computer system 100 may use virtual addressing mechanisms that allow the programs of the computer system 100 to behave as if they only have access to a large, single storage entity instead of access to multiple, smaller storage entities. Thus, while the dynamic search engine 130, the search domain 132, the source data object 134, the result set 136, and the feature extractor 138 are illustrated as being contained within the main memory 108, these elements are not necessarily completely contained in the same storage device at the same time. Further, the dynamic search engine 130, the search domain 132, the source data object 134, the result set 136, and the feature extractor 138 are illustrated as being separate entities, in other embodiments some of them, portions of some of them, or all of them may be packaged together.

In an embodiment, the dynamic search engine 130, the search domain 132, the source data object 134, the result set 136, and the feature extractor 138 may include instructions or statements that execute on the processor 106 or instructions or statements that may be interpreted by instructions or statements that execute on the processor 106, to carry out the functions as further described below with reference to FIGS. 2, 3, 4, 5, 6, 7, and 8. In another embodiment, the dynamic search engine 130, the search domain 132, the source data object 134, the result set 136, and the feature extractor 138, or two or more of these elements may be implemented in hardware via semiconductor devices, chips, logical gates, circuits, circuit cards, other physical hardware devices, or a combination of these devices in lieu of, or in addition to, a processor-based system. In an embodiment the dynamic search engine 130, the search domain 132, the source data object 134, the result set 136, and the feature extractor 138, or two or more of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communications paths from the computer system 100 to other digital devices and client computer systems 102; such paths may include, e.g., one or more networks 104.

Figure 2:
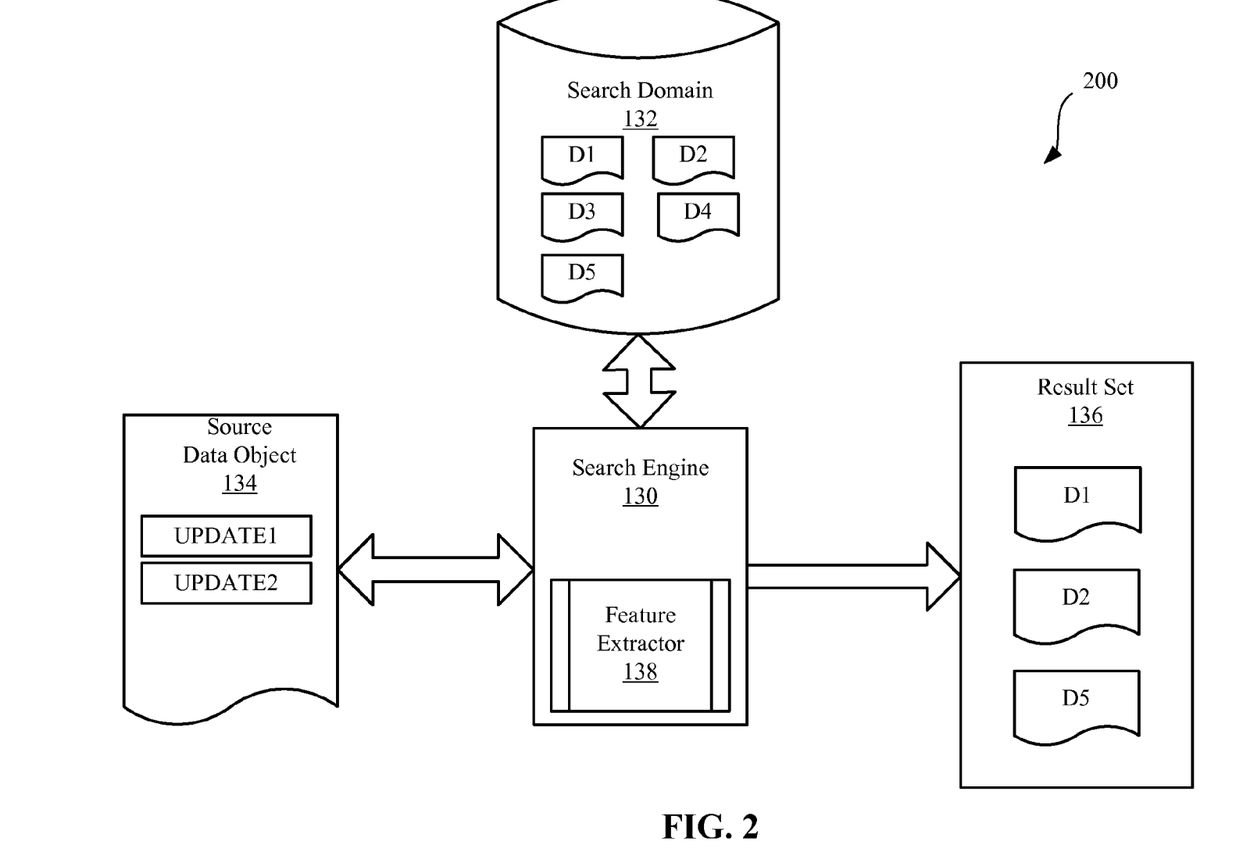
FIG. 2 depicts a dynamic search system, according to an embodiment.

FIG. 2 depicts a dynamic search system 200, according to an embodiment. The dynamic search system 200 may include the search engine 130, the search domain 132, source data object 134, the result set 136, and the feature extractor 138. The search domain 132 may contain one or more data objects. FIG. 2 shows the search domain containing five data objects (D1, D2, D3, D4, and D5) for example purposes. The data objects D1-D5 may be any sort of data or data structure that may be added to the search domain 132 and that are searchable.

To better illustrate embodiments herein, an exemplary implementation of the embodiments may be described periodically in relation to customer support trouble tickets. It should be noted that this example should not be limiting and the embodiments herein may be used in other situations. Therefore, the data objects D1-D5 may be trouble tickets in the dynamic search system 200 where each ticket may be a customer complaint about a particular product that gets updated periodically.

The dynamic search system 200 may include a source data object 134 from which search features are obtained. The source data object 134 may be an active data object from the search domain 132. Therefore, the source data object 134 may be added to the search domain 132 when it is created. The source data object 134 may be active in the sense that work is still being done to it. For instance, in the technical support example the source data object may be an open trouble ticket for an issue with a product from a customer. The source data object 134 may remain open and may be updated during the life of the investigation of the complaint until it closes. Each source data object 134 may include one or more updates (UPDATE1 and UPDATE2). Each update may contain features that may be useful when searching for data objects in the search domain 132 that may contain similar features. Features may include data, terms, and numbers within the data objects.

The dynamic search system 200 may include a search engine 130. The search engine 130 may include the feature extractor 138. The search engine 130 may monitor the search domain 132 and the source data object 134 for updates. If updates are detected in the source data object 134 or the search domain 132, then the search engine 130 may automatically perform a search of the search features of the source data object 134. If updates are made to the source data object 134, then the feature extractor 138 may automatically perform a feature extraction from the source data object 134. Feature extraction by the feature extractor 138 may find one or more key features in the source data object 138 and extract them to be included in the search features used by the search engine 130 when searching the search domain 132. Feature extraction will be described in more detail below. In another embodiment, the search engine may alert the user of updates in the source data object 134 and source domain 132

In an embodiment, if there are multiple source data objects 134 and the search domain 132 is updated, then the search engine 130 may automatically perform a search of the search domain 132 for each source data object 134. In another embodiment, each source data object 134, which is an active data object, may also be part of the search domain 132. Therefore, if there are multiple source data objects 134 and there is an update to one of the source data objects 134, then the feature extractor 138 may perform a feature extraction on the updated source data object 134. Also, the search engine 130 may perform a search of the search domain 134 for the key features of each source data object 134 since the search domain 132 may update when the source data object 134 updates.

The dynamic search system 200 may also include the result set 136. The result set 136 may be created by the search engine after the searching for the search features. The result set 136 may be data objects (D1-D5) of the search domain 132 that may contain the one or more of the search features. In the illustrated example, based on the key features extracted from UPDATE1, UPDATE2, and features entered in by a user, the search engine 130, after searching the search domain 132 for the search features, may return the result set 136. The result set 136 may include D1, D2, and D5 as being similar enough to the source data object 134 from which the search features were obtained. The results set 136 may depend on the search features and the various types of algorithms that the search engine 130 uses. The result set 136 provided by the dynamic search system 200 may provide potential useful information of similar instances of the source data object 134. In the trouble ticket example, the result set may provide similar inactive trouble tickets with possible resolutions to the current problem.

Figure 3:
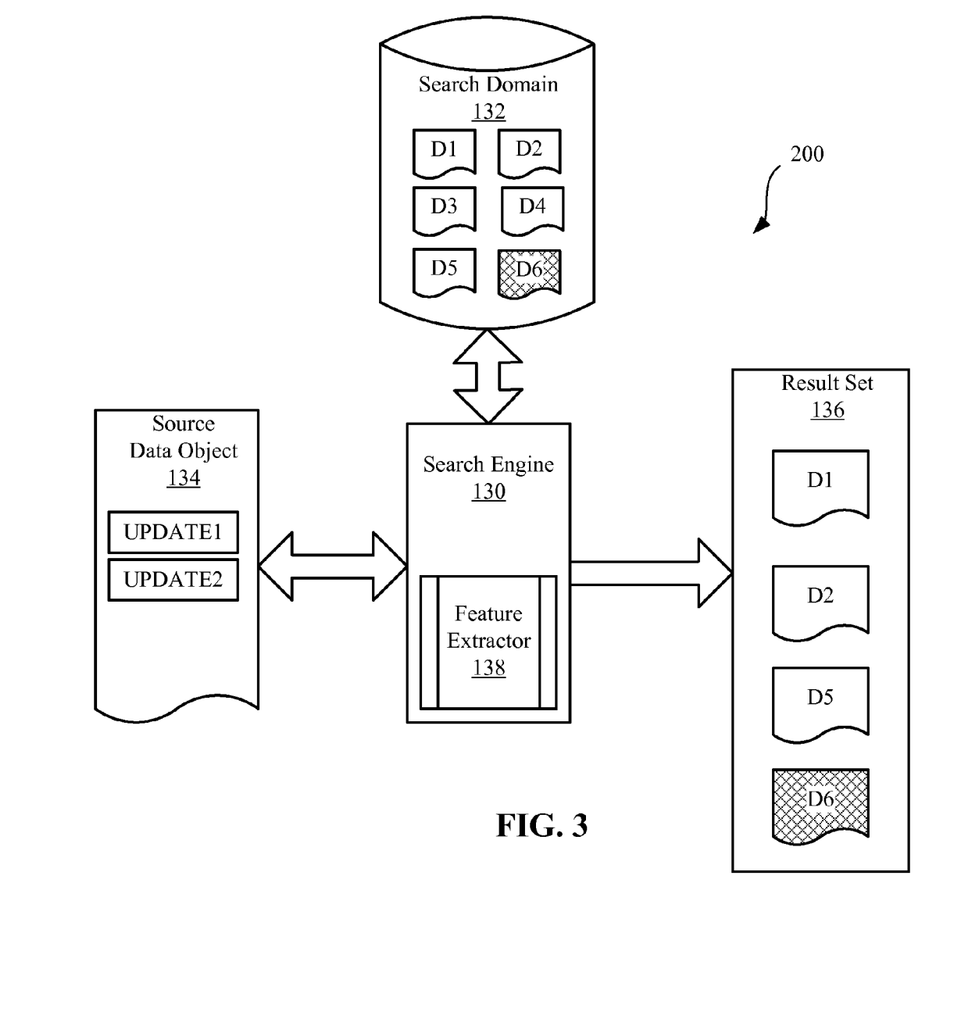
FIG. 3 depicts the dynamic search system after an update to a search domain, according to an embodiment.

FIG. 3 illustrates the dynamic search system 200 of FIG. 2 when there is an update in the search domain 132, according to an embodiment. The update in the search domain 132 may be an additional data object D6 added to the search domain (such as a source data object for a new trouble ticket) or an update in an existing data object (D1-D5). In an embodiment, the search engine 130 may detect the update by monitoring a time stamp of the data objects in the search domain 132. In another embodiment, a data object manager or the search domain 132 may notify the search engine 130 of updates. In the example illustrated in FIG. 3, the search engine 130 may detect the update in the search domain 132. A new search of the search domain 132 may then be performed by the search engine 130 using search features that may include key features from UPDATE1, UPDATE2, and any other features entered by the user. If the new data object D6 is found to be relevant to the key features, then the search engine 130 may return, in the result set 136, D6 along with the other relevant data objects (D1, D2, and D5).

Figure 4:
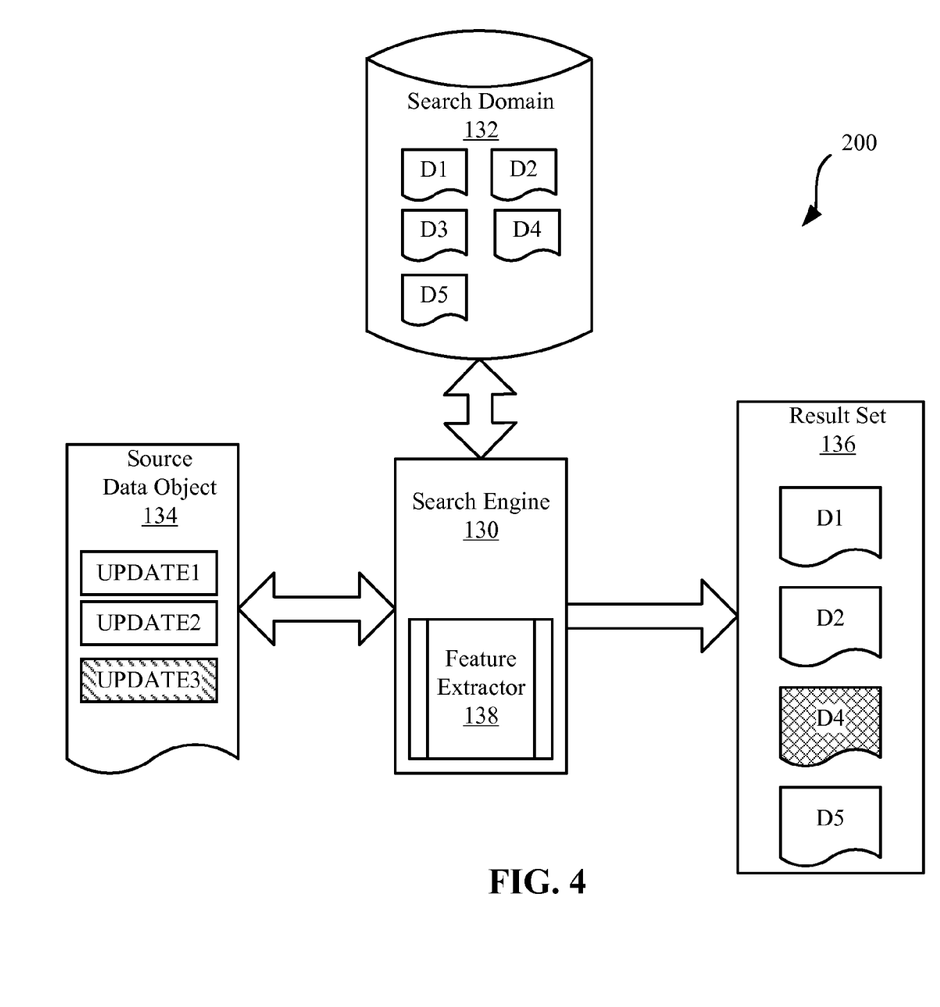
FIG. 4 depicts the dynamic search system after an update to a source data object, according to an embodiment.

FIG. 4 illustrates the dynamic search system 200 of FIG. 2 when there is an update in the source data object 134 from which search features are determined, according to an embodiment. E.g., a user may learn additional information and create an updated source data object 134. The update to the source data object 134 may be UPDATE3. The UPDATE3 may contain additional key features. The UPDATE3 may also remove key features from the source data object 134, e.g., the user may remove information from the source data object 1334. In an embodiment, the search engine 130 may detect the update by monitoring a time stamp of the source data object 134. In the example illustrated in FIG. 4, the search engine 130 may detect the update in the source data object 134. The feature extractor 138 may perform a feature extraction to obtain all the key features from the source data object 134. The key features may be added to the search features along with any user input features. A new search of the search domain 132 may then be performed by the search engine 130 using the search features from UPDATE1, UPDATE2, UPDATE3, and any other features entered by the user. The search engine 130 may return the result set 136 D4, for example, along with the other relevant data objects (D1, D2, and D5) due to the new search features used by the search of the search engine 130.

Figure 5:
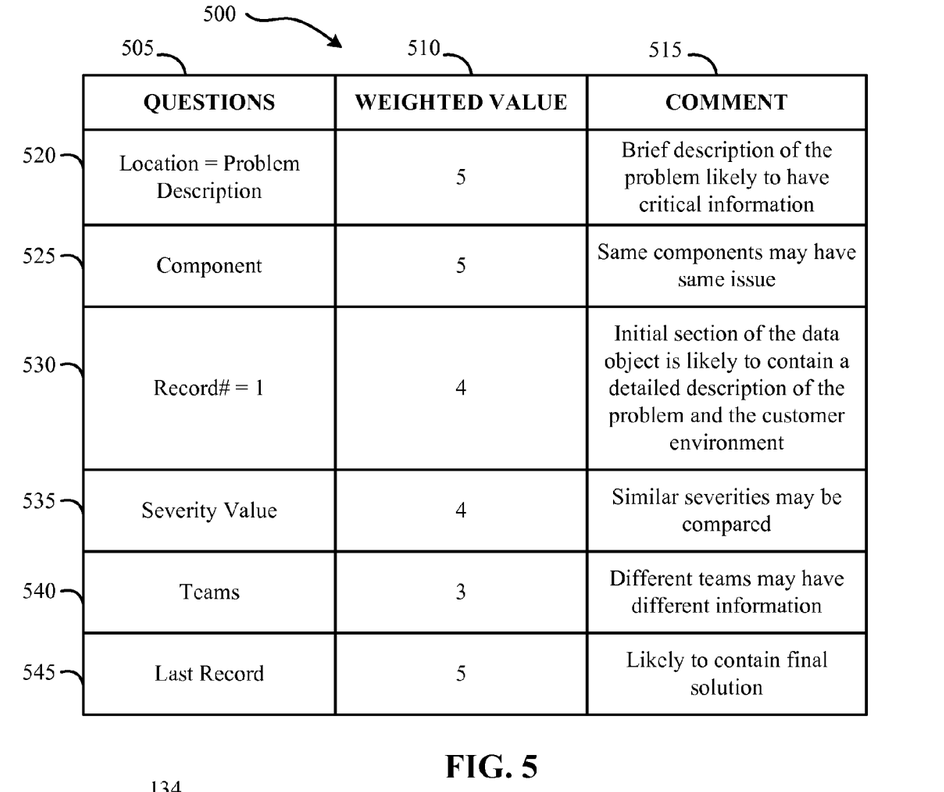
FIG. 5 depicts a table of an example data structure of one or more rules for a feature extractor, according to an embodiment.

FIG. 5 illustrates a rule table 500 of a feature extractor 138, according to an embodiment. The feature extractor 138 may automatically extract key features from the original source data object 134 and updates to the source data object 134 when directed by the search engine. In other embodiments, the search engine 130 may alert the user of updates of the dynamic search system 200 whom may manually start the feature extractor 138. Extracting the key features from a source data object 134 may be referred as feature extraction. In an exemplary embodiment, the feature extractor 134 may have a rules table 500 with a set of rules that determines the key features of the source data object 134 to be extracted. In one embodiment, the rules may identify high value zones within the source data object. The features extracted from the high value zones may be weighted relative to each other and the rest of the data object. The high value zones may be areas of the data object 134 that contain key features.

The rule table 500 of FIG. 5 may illustrate exemplary questions and weighted values to obtain rules for the trouble ticket scenario. Column 505 may be a list of the questions. Column 510 may be the weighted value of the answer of the questions. Column 515 may be a comment about the rules. The rules may direct the feature extractor 138 to high value zones of the source data object 132 to extract key features. In the trouble ticket example, high values zones may include a problem description in the ticket in row 520. The problem description may likely have critical features of the problem. Another high value zone may be a location in the source data object 134 where it says the component or product having the problem, in row 525. This may be a high value zone because the same components may have the same issues. In row 530, there may be a rule for the feature extractor 138 to look for features in the first record because the initial section of the source data object 134 is likely to contain a detailed description of the problem and the customer environment. In row 535, a severity value may be another high value zone because similar severities may show similar problems and results. Also, if the current severity is greater than previous severity, new information may be made available. In row 540, teams working on the ticket may be compared with teams on different tickets for information gathering and collaboration. Also, if current team does not equal the previous team, then the previous team may have good information when the problem is transferred. In row 545, there may be a rule to look at the last record of the ticket for feature extraction because this may be where the final solution is located.

Figure 6:
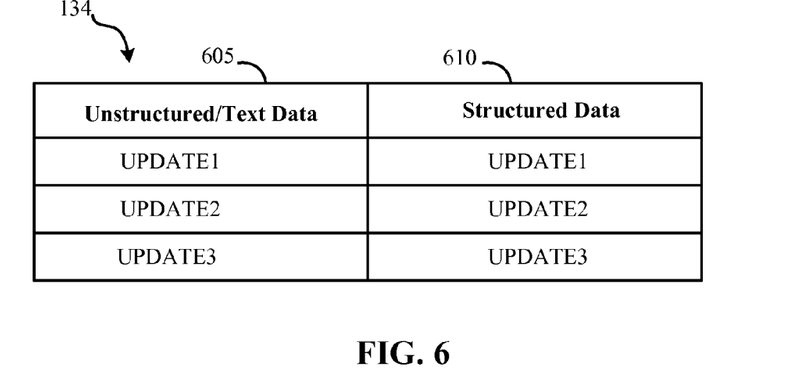
FIG. 6 depicts a table of an example data structure of the source data object, according to an embodiment.

FIG. 6 illustrates an exemplary format of the source data object 134, according to an embodiment. To extract features from the source data object 134 with the feature extractor 138, the source data object 134 may be formatted to have unstructured data 605 and structured data 610. Unstructured data 605 may be textual data in the source data object 134. For example, referring to the trouble ticket example, the first record may contain a detailed description of the problem. The structured data 610 may be data that is limited in the number of possibilities that data may be. For example, the severity value may be in a range of numbers or the component of the trouble ticket may be selected from a finite list of components. Each update (UPDATE1, UPDATE2, and UPDATE3) to the source data object 134 may contain both unstructured data 605 and structured data 610.

Extraction of key features may be done by many techniques. In an embodiment, the structured data 610 may be extracted easily from the source data object 134 because the feature extractor 138 may know exactly where the key features of the structured data are going to be. In another embodiment, key features of the unstructured data 605 may extracted by the feature extractor 138 based on a library of key features in which the feature extractor 138 searches. The feature extractor 138 may also determine feature frequency by searching all data objects. It may extract features that are found to be reoccurring in multiple data objects. If the features are found in high value zones, then the features may be given more weight as whether to extract them or not so that they may be added to the search features. The feature extractor 138 may also recognize frequent words that are not key features such as prepositions and articles of sentences to limit them from feature extraction.

Figure 7:
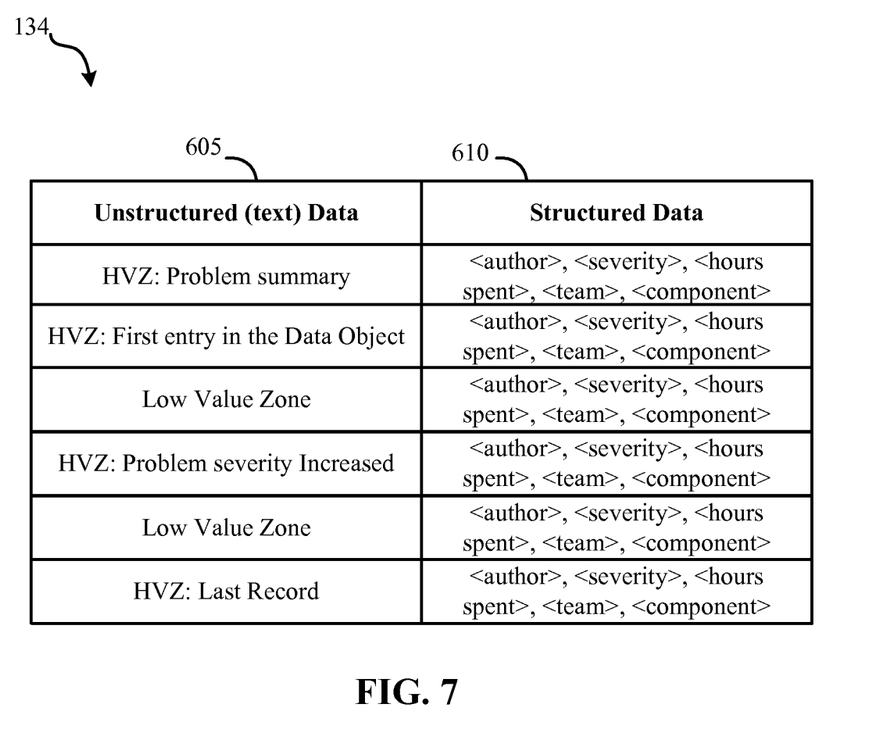
FIG. 7 depicts a table of an example data structure of an update of the source data object of FIG. 6, according to an embodiment.

FIG. 7 illustrates an example of the source data object 134 with high value zones and low value zones in relation to unstructured data 605 and structured data 610, by combing aspects of the rule table 500 of FIG. 5 and the source data object 134 of FIG. 6, according to an embodiment. The unstructured data column 605 may have high value zones defined by the rules of rule table 500 of FIG. 5. For example the problem summary, severity increase, and closing summary may be high value zones all with unstructured data. There may be low value zones within the unstructured data as well that is not governed by the rules of rule table 500. The column with structured data 610 may include high value zones and low value zones. The each block of the structure data 610 illustrates possible structured data in the data object 132.

Figure 8:
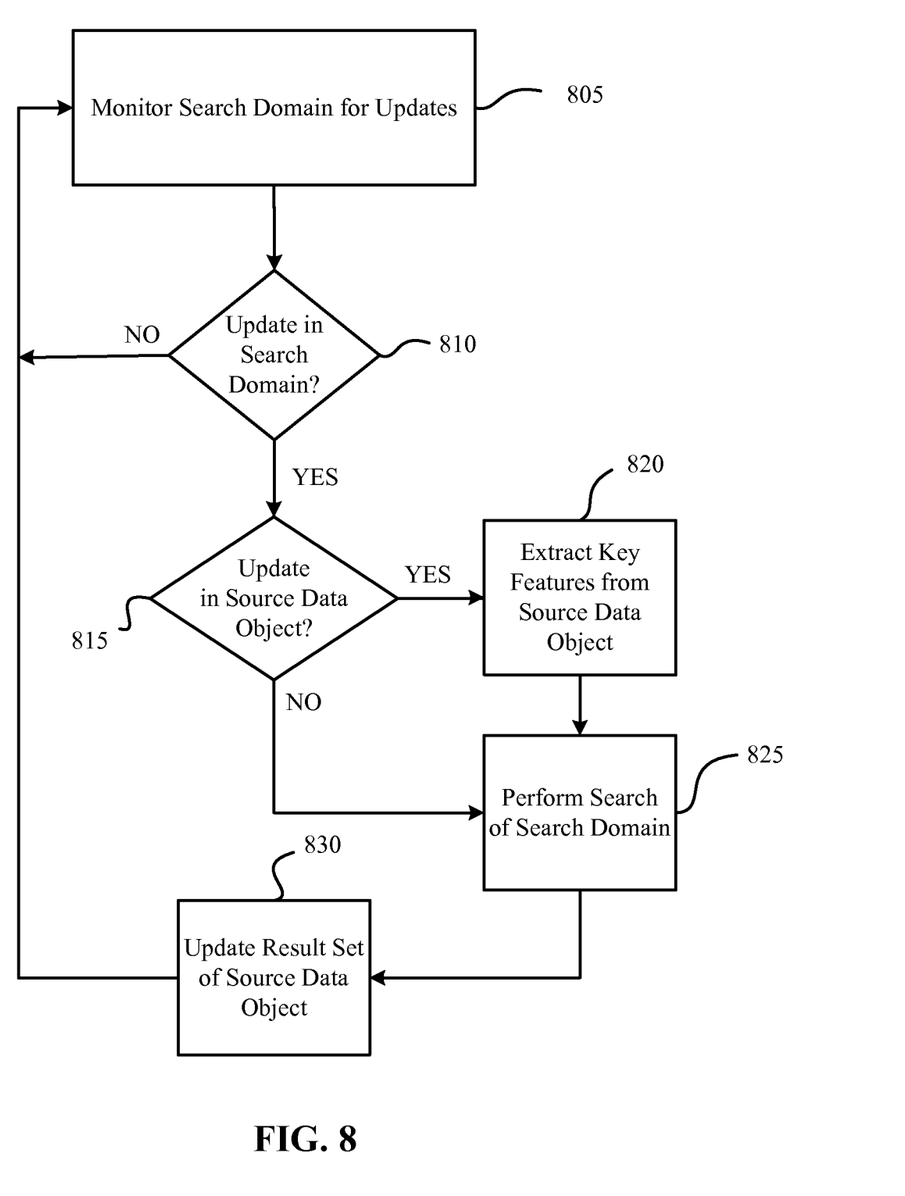
FIG. 8 depicts a flow chart of an exemplary method of dynamically searching a search domain from a source data object, according to an embodiment.

FIG. 8 illustrates a method 800 of a dynamic search, according to an embodiment. In operation 805, the dynamic search engine 130 may monitor the dynamic search system 200 for any updates. The updates may occur in the search domain 132, or the source data object 134, or both locations. In operation 810, if there are updates in the search domain 132, then, in operation 815, it may be determined whether the updates are in the source data object 134 or if there are additional updates in the source data object 134 exclusive of the updates in the search domain. If there are not updates in the search domain 132 then the method 800 may return to monitoring the search domain 132 for updates in operation 805. In operation 815, it may be determined whether there are updates in the source data object 134. If there are updates in the source data object 134, then, in operation 820, the feature extractor 138 may extract key features from the source data object 134 automatically or may give the user the option to do so. The method may continue to operation 825 and a search of the search domain 132 may be performed with search features. Returning to operation 815, if there are no updates in the source data object 134, then the method may continue with operation 825 in performing a search of the updated search domain 132. In operation 830, the search engine 130 may update the result set 136 with any new search results for the search features of the source data object 134 being searched. The dynamic search engine 130 may then return to monitoring the dynamic search system 100 for updates.

In an embodiment, the search engine 130 may return a result set based on clustering algorithms. A clustering algorithm may be applied to categorize data objects of the search domain 132. A data object vector may be formed based on the results of a feature extraction. The data object vectors may include the frequency of each feature and the weighted values of those features depending on the weighted value of the zone they are found in the data objects. The data object vectors then may be clustered to categorize the results of the search so that similar results are grouped together for the user to visualize.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The client computer system 102 may include some or all of the hardware and/or computer program elements of the computer system 100. The various program components implementing various embodiments may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various embodiments. Embodiments may be embodied as a system, method, or computer program product. Accordingly, embodiments may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this data object, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for embodiments may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment. But, any particular program nomenclature used herein is used merely for convenience, and thus are not limited to use solely in any specific application identified and/or implied by such nomenclature. The exemplary environments illustrated in 1 are not intended to limit the present invention. Indeed, other alternative hardware and/or program environments may be used without departing from the scope of embodiments.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other updates may be made without departing from the scope of the present invention. In the previous description, numerous specific details were set forth to provide a thorough understanding of embodiments. But, embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method comprising:

identifying a search domain including a plurality of data objects, the data objects having a plurality of zones, a rule table associated with the search domain defining criteria for a high value zone;

determining that a first zone in the search domain does not satisfy the criteria for a high value zone;

determining that a second zone in the search domain satisfies the criteria for a high value zone;

detecting a task associated with a source data object, the source data object having the plurality of zones, a first search feature from the first zone associated with the task;

extracting a second search feature from the second zone of the source data object based on the second zone satisfying the criteria for a high value zone;

performing, based on the detecting the task, a first search of the search domain, the first search based at least in part on the first search feature and the extracted second search feature, the first search producing a first result set from the plurality of data objects, a first data object included in the first result set based on the first search feature and a second data object included in the first result set based on the second search feature;

presenting the first result set with the first data object presented as a low value result and with the second data object presented as a high value result;

detecting, after the presenting the first result set, an update to the search domain;

determining, after the detecting the update, that the first zone in the search domain satisfies the criteria for a high value zone;

performing, based on the detecting the update, a second search of the search domain, the second search based at least in part on the first search feature and the extracted second search feature, the second search producing a second result set from the plurality of data objects, the first data object included in the second result set based on the first search feature and the second data object included in the second result set based on the second search feature; and presenting the second result set with the first data object presented as a high value result and with the second data object presented as a high value result.

2. The method of claim 1, further comprising:

adding the source data object to the plurality of data objects in the search domain.

3. The method of claim 1, wherein the search domain is a database, wherein each of the plurality of data objects is a customer support task, and wherein the source data object is a source customer support task.

4. The method of claim 1, further comprising:

detecting, after the presenting the second result set, a second update to the search domain;

determining, after the detecting the second update, that the first zone in the search domain does not satisfy the criteria for a high value zone;

performing, based on the detecting the second update, a third search of the search domain, the third search based at least in part on the first search feature and the extracted second search feature, the third search producing a third result set from the plurality of data objects, the first data object included in the third result set based on the first search feature and the second data object included in the third result set based on the second search feature; and presenting the third result set with the first data object presented as a low value result and with the second data object presented as a high value result.

5. The method of claim 1, wherein the rule table includes a weighted value for each of the plurality of zones in the source data object, and wherein the weighted value for the first zone satisfies predetermined criteria associated with the high value zone.

6. The method of claim 1, wherein the first zone contains unstructured data.

* * * * *